United States Patent
Liu

(10) Patent No.: US 8,451,943 B2
(45) Date of Patent: May 28, 2013

(54) METHOD AND DEVICE FOR TRANSMITTING SIGNAL

(75) Inventor: Jie Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/334,511

(22) Filed: Dec. 22, 2011

(65) Prior Publication Data

US 2012/0093260 A1 Apr. 19, 2012

Related U.S. Application Data

(63) Continuation of application No. PCT/CN2010/074186, filed on Jun. 22, 2010.

(30) Foreign Application Priority Data

Jun. 22, 2009 (CN) .......................... 2009 1 0148295

(51) Int. Cl.
H04L 25/03 (2006.01)

(52) U.S. Cl.
USPC .......................................................... 375/296

(58) Field of Classification Search
USPC .......................................................... 375/296
See application file for complete search history.

(56) References Cited

U.S. PATENT DOCUMENTS

| 7,697,625 | B2 * | 4/2010 | Kim et al. ..................... 375/267 |
| 2007/0121737 | A1 | 5/2007 | Yoshii et al. | |

FOREIGN PATENT DOCUMENTS

| CN | 1338852 A | 3/2002 |
|---|---|---|
| CN | 1385975 A | 12/2002 |
| CN | 1400830 A | 3/2003 |
| CN | 1437795 A | 8/2003 |
| CN | 1538650 A | 10/2004 |
| CN | 1866944 A | 11/2006 |
| CN | 101103606 A | 1/2008 |
| CN | 101227446 A | 7/2008 |
| CN | 101582746 A | 11/2009 |
| EP | 1659722 A1 | 5/2006 |
| EP | 1 879 296 A2 * | 1/2008 |
| JP | 2004336564 A | 11/2004 |

OTHER PUBLICATIONS

1$^{st}$ Office Action in corresponding Chinese Patent Application No. 200910148295.6 (Jun. 16, 2011).
Extended European Search Report in corresponding European Patent Application No. 10791518.3 (Jun. 22, 2012).
International Search Report in corresponding International Patent Application No. PCT/CN2010/074186 (Sep. 23, 2010).
Written Opinion of the International Searching Authority in corresponding International Patent Application No. PCT/CN2010/074186 (Sep. 23, 2010).

* cited by examiner

Primary Examiner — Kevin Kim
(74) Attorney, Agent, or Firm — Leydig, Voit & Mayer, Ltd

(57) ABSTRACT

Embodiments of the present invention disclose a method and a device for transmitting a signal, and relate to the field of communications. The technical solutions provided by the embodiments of the present invention are: the method for transmitting a signal, including: determining a peak clipping threshold of a signal according to f(MCS), where MCS represents a modulation and coding scheme (MCS) of the signal, and f(MCS) is a corresponding relationship between the MCS and noise at a receiving end; performing peak clipping on the signal by using the peak clipping threshold to obtain a peak-clipped signal; and transmitting the peak-clipped signal. According to the embodiments of the present invention, different peak clipping thresholds may be selected according to different MCSs, and thus, the reliability of data transmission is improved.

7 Claims, 3 Drawing Sheets

US 8,451,943 B2

METHOD AND DEVICE FOR TRANSMITTING SIGNAL

CROSS-REFERENCE TO RELATED APPLICATIONS

This application is a continuation of International Application No. PCT/CN2010/074186, filed on Jun. 22, 2010, which claims priority to Chinese Patent Application No. 200910148295.6, filed on Jun. 22, 2009, both of which are hereby incorporated by reference in their entireties.

FIELD OF THE INVENTION

The present invention relates to the field of communications, and in particular, to a method and a device for transmitting a signal.

BACKGROUND OF THE INVENTION

In a wireless communication system, a signal at a transmitting end is usually a superposition of multiple signals. For example, in an Orthogonal Frequency Division Multiplexing (OFDM) system, the signal at the transmitting end is a superposition of multiple sub-carrier signals; in a Code Division Multiple Access (CDMA) system, the signal at the transmitting end is a superposition of multiple code word signals. This kind of signal composition leads to a high Peak Average Rate (PAR) of the signal. A mathematical definition of the PAR is:

$$PAR = 10\log\left(\frac{\max|s(t)|^2}{E[|s(t)|^2]}\right)(db)$$

where s(t) is a time domain signal; max(*) represents a maximum value; E[*] represents a mathematical expectation value.

A high PAR restricts the efficiency of a power amplifier and increase power consumption. Therefore, the PAR needs to be suppressed, and average transmission power of the signal may be improved through suppressing the PAR.

In the prior art, an amplitude limiting filter technology is adopted to suppress the PAR. A fixed amplitude threshold is selected, and all time domain values greater than the threshold are limited to the threshold value. Then out-of-band radiation power is limited through multiple times of filtering.

However, amplitude limiting not only improves the average power of transmitting the signal, but also introduces extra noise. If the selected amplitude threshold is too great, the effect of reducing the PAR is insignificant; if the selected amplitude threshold is too small, the introduced noise is increased, which leads to an increase in the probability of a signal receiving error. For example, for a signal of 64 Quadrature Amplitude Modulation (64 QAM) and $15/16$ code rate, the signal may fail to be received correctly.

SUMMARY OF THE INVENTION

Embodiments of the present invention provide a method and a device for transmitting a signal. Different peak clipping thresholds are selected according to different modulation and coding schemes (MCSs), and thus, the reliability of signal transmission can be improved.

In order to achieve the foregoing objectives, the embodiments of the present invention adopt the following technical solutions.

A method for transmitting a signal includes:
determining a peak clipping threshold of a signal according to f(MCS), where MCS represents an MCS of the signal, and f(MCS) is a corresponding relationship between the MCS and noise at a receiving end;
performing peak clipping on the signal by using the peak clipping threshold to obtain a peak-clipped signal; and
transmitting the peak-clipped signal.

A device for transmitting a signal includes:
a selecting module, configured to select a peak clipping threshold according to an MCS of a signal, where the selecting the peak clipping threshold according to the MCS of the signal includes: determining the peak clipping threshold of the signal according to f(MCS), where MCS represents the MCS of the signal, and f(MCS) is a corresponding relationship between the MCS and noise at a receiving end;
a processing module, configured to perform peak clipping on the signal by using the peak clipping threshold to obtain a peak-clipped signal; and
a transmitting module, configured to transmit the peak-clipped signal.

The embodiments of the present invention provide a method and a device for transmitting a signal. In the technical solutions provided in the embodiments of the present invention, the peak clipping threshold is selected according to the corresponding relationship between the MCS and the noise at the receiving end, and peak clipping is performed on the signal by using the selected peak clipping threshold. The embodiments of the present invention can select different peak clipping thresholds according to different MCSs of the signal, so that a signal-to-noise ratio of a received signal is optimal, and thus, the reliability of signal transmission is greatly improved.

DETAILED DESCRIPTION OF THE EMBODIMENTS

An embodiment of the present invention provides a method for transmitting a signal. Different peak clipping thresholds are selected according to different MCSs, and output power of the transmitted signal is reduced, and thus, the reliability of data receiving is improved.

The method and the device for transmitting a signal that are provided in the embodiments of the present invention are described in detail below with reference to the accompanying drawings.

Figure 1:
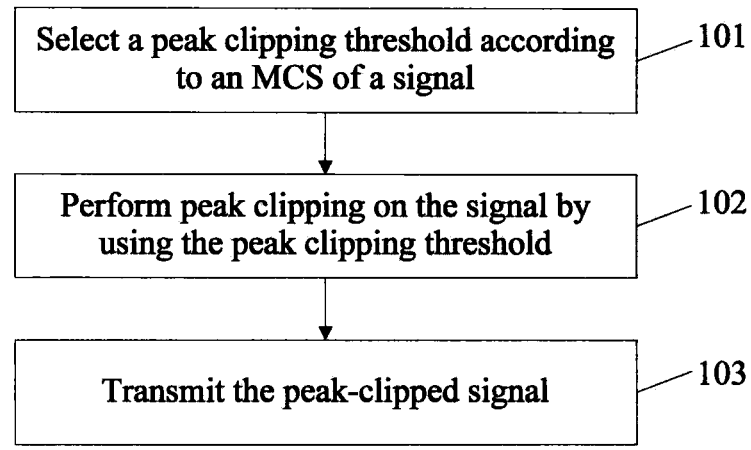
FIG. 1 is a schematic flow chart of a method for transmitting a signal according to an embodiment of the present invention.

An embodiment of the present invention provides a method for transmitting a signal. As shown in FIG. 1, the method for transmitting a signal includes:

101: Select a peak clipping threshold according to an MCS of a signal.

Before transmitting a baseband signal, a transmitting end first performs peak clipping on the signal, converts the peak-clipped signal to an intermediate-frequency signal, then converts the intermediate-frequency signal to a radio frequency (RF) signal, and finally transmits the RF signal to a wireless terminal through an antenna.

When selecting the peak clipping threshold, the transmitting end may determine a threshold according to the MCS of the signal. For example, the transmitting end may select the peak clipping threshold according to the MCS used by the signal and relative noise at a receiving end; alternatively, the transmitting end may select the peak clipping threshold according to the MCS used by the signal and a parameter k, where the parameter k is any value smaller than 1.

102: Perform peak clipping on the signal by using the peak clipping threshold.

After determining the peak clipping threshold, the transmitting end selects a peak clipping manner to perform peak clipping on the signal. A technology that the transmitting end selects a peak clipping manner to perform peak clipping on the signal after determining the peak clipping threshold belongs to the prior art, and is not described in detail here.

103: Transmit the peak-clipped signal.

The transmitting end coverts the peak-clipped signal to an intermediate-frequency signal, converts the intermediate-frequency signal to an RF signal, and then transmits the RF signal to a wireless terminal through an antenna.

Optionally, the transmitting end may further select an MCS for the signal according to a signal-to-noise ratio of the peak-clipped signal, and transmit the signal according to the selected MCS.

The embodiment of the present invention provides a method for transmitting a signal. In the technical solution provided in the embodiment of the present invention, the peak clipping threshold is selected according to the MCS of the signal, and peak clipping is performed on the signal by using the selected peak clipping threshold. The embodiment of the present invention can select different peak clipping thresholds according to different MCSs of the signal, so that the signal-to-noise ratio of received data is optimal, and thus output power of the transmitted signal is reduced and the reliability of data receiving is greatly improved.

The method for transmitting a signal provided in the embodiment of the present invention is further described in detail below with reference to FIG. 2.

In this embodiment, a transmitting end first determines a peak clipping threshold according an MCS of a signal. Then a peak clipping module selects a peak clipping manner according to the determined peak clipping threshold to perform peak clipping on the signal. Then, the transmitting end re-selects a proper MCS according to a signal-to-noise ratio introduced by the peak-clipped signal.

Generally, when a Bit Error Rate (BER) of a received signal is fixed, an MCS of the signal has a certain corresponding relationship with an SNR value of the received signal. For example, for a received signal with a BER of 0.1%, when an MCS of the signal is QPSK, and a Turbo code rate is ⅓, an SNR value of the received signal is about 0 db; when the MCS of the signal is 16 QAM and the Turbo code rate is ⅔, the SNR value of the received signal is about 10 db. When power for the transmitted signal is known, and the MCS of the signal has a certain corresponding relationship with noise intensity $n_T$ of the received signal, and the corresponding relationship may be represented by a function $n_T = f(MCS)$.

Any MCS is required to satisfy $$\frac{n_r}{G^2} + \frac{n_1}{h^2 G^2} \le f(MCS),$$

where $n_1$ is noise introduced by a signal at a receiving end, $n_r$ is power of noise introduced after peak clipping, and G is a peak clipping threshold.

Figure 2:
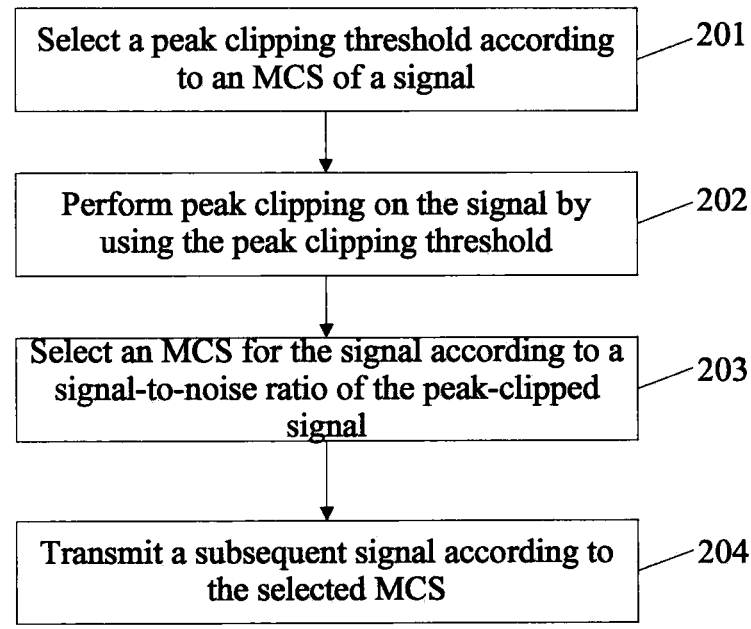
FIG. 2 is a schematic flow chart of a method for transmitting a signal according to an embodiment of the present invention.

As shown in FIG. 2, the method includes:

201: Select a peak clipping threshold according to an MCS of a signal.

If a transmitting end knows relative noise $$\frac{n_1}{h^2}$$

at a receiving end, it can be seen according to a formula $$\frac{n_r}{G^2} + \frac{n_1}{h^2 G^2} \le f(MCS)$$

that when the MCS of the signal and $$\frac{n_1}{h^2}$$

are known, a corresponding value of a peak clipping threshold G may be obtained through table lookup or direct calculation.

If the transmitting end does not know the relative noise $$\frac{n_1}{h^2}$$

at the receiving end, it can be known that when $$\frac{n_r}{G^2} \ll f(MCS), \frac{n_r}{G^2} + \frac{n_1}{h^2 G^2} \le f(MCS),$$

is basically satisfied. At this time, the influence of $$\frac{n_r}{G^2}$$

on f(MCS) may be ignored. In this embodiment, $$\frac{n_r}{G^2} = k * f(MCS)$$

is adopted, where k may be any value smaller than 1 and greater than 0. For example, k=0.1 may be selected, which indicates that noise introduced by peak clipping only accounts for ⅒ of a noise threshold corresponding to the MCS of the signal at this time, and therefore, the influence of the noise on total noise may be ignored. After a value of k is selected, the corresponding value of the peak clipping threshold G may be calculated according to the value of k and the MCS of the signal.

202: Perform peak clipping on the signal by using the peak clipping threshold.

After determining the peak clipping threshold, the transmitting end selects a peak clipping manner to perform peak clipping on the signal. A technology that the transmitting end selects a peak clipping manner to perform peak clipping on the signal after determining the peak clipping threshold belongs to the prior art, and is not described in detail here.

203: Select an MCS for the signal according to a signal-to-noise ratio of the peak-clipped signal.

When selecting the MCS of the signal, not only the MCS may be selected according to channel quality fed back by the receiving end, but also a higher MCS may be selected by taking an increase in the signal-to-noise ratio of the signal at the receiving end after peak clipping into consideration, for example, if the modulation scheme is changed from OPSK to 16 QAM, the code rate is increased from ⅓ to ⅔, so that the data transmission rate may be improved.

204: Transmit a subsequent signal according to the selected MCS.

Afterward, the transmitting end transmits the subsequent signal according to the selected MCS.

Figure 3:
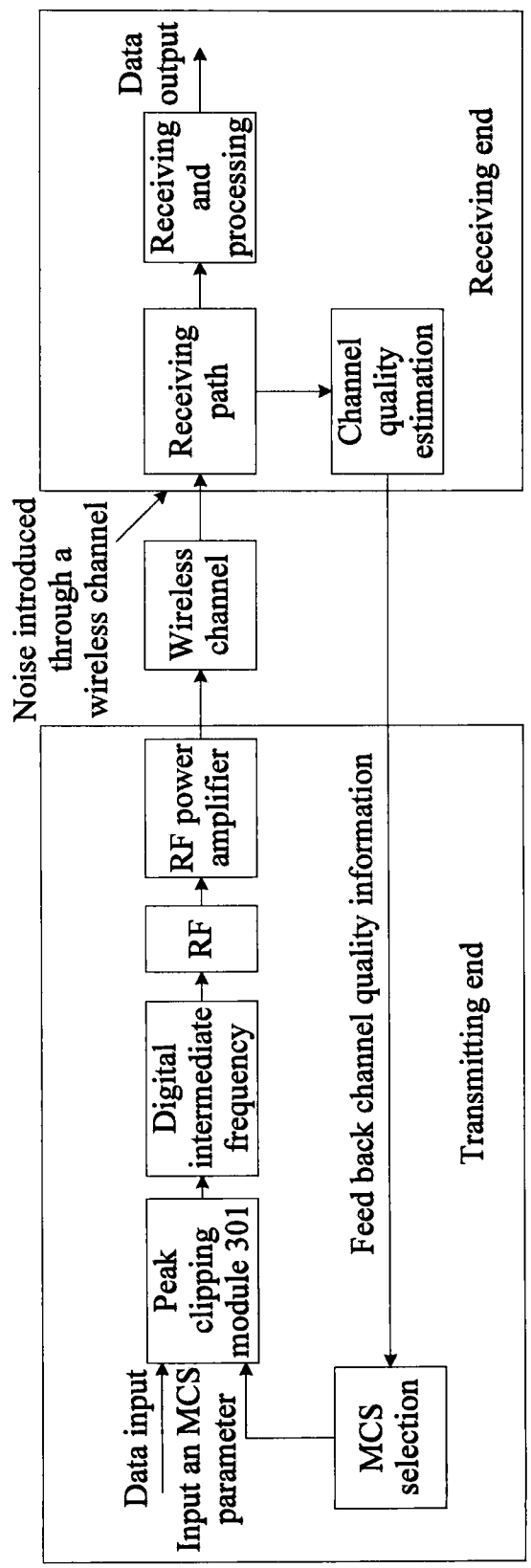
FIG. 3 is a schematic architecture diagram of a communication system according to an embodiment of the present invention.

FIG. 3 is a schematic diagram of a transmitting end and a receiving end in a communication system. The transmitting end selects a peak clipping threshold according to an MCS of the signal. If channel quality information fed back by the receiving end includes relative noise at the receiving end, the transmitting end determines the peak clipping threshold according to the MCS of the signal and the relative noise at the receiving end. In the communication system shown in FIG. 3, it is assumed that a peak value of an output signal of a peak clipping module 301 is 1 V, amplitude distribution of the output signal is p(r), and effective power of the output signal is $S_0$ in the case that peak clipping is not performed.

$r_b$ in the p(r) distribution is selected as a peak clipping point. It is assumed that $Gr_b=1$; all data is amplified by G times, and the signal power is amplified by $G^2$ times.

Then, a signal-to-noise ratio of the signal at the transmitting end before peak clipping is:

$$SNR = \frac{S_0}{n_0}.$$

Power of noise introduced after peak clipping is:

$$n_r = \int_{r_b}^{1} G^2 (r - r_b)^2 p(r) dr.$$

If a quantized noise power spectral density is $n_0$, a signal-to-noise ratio of the signal at the transmitting end after peak clipping is:

$$SNR = \frac{G^2 S_0}{G^2 n_0 + n_r}.$$

It can be seen that, peak clipping performed on the signal by the transmitting end reduces the signal-to-noise ratio of the signal.

It is assumed that a wireless path loss intensity is h, and according to the channel quality information fed back by the receiving end, noise introduced by a signal at the receiving end is $n_1$. Then a signal-to-noise ratio of the signal at the receiving end after peak clipping is:

$$SNR_r = \frac{h^2 G^2 S_0}{h^2 G^2 n_0 + h^2 n_r + n_1} = \frac{S_0}{n_0 + \left(\frac{n_r}{G^2} + \frac{n_1}{h^2 G^2}\right)}.$$

A signal-to-noise ratio of the signal at the receiving end before peak clipping is:

$$SNR_r = \frac{h^2 S_0}{h^2 n_0 + n_1} = \frac{S_0}{n_0 + \frac{n_1}{h^2}}.$$

It can be seen that, when $$\frac{n_r}{G^2} + \frac{n_1}{h^2 G^2} \le \frac{n_1}{h^2},$$

the signal-to-noise ratio of the signal at the receiving end after peak clipping is greater than or equal to the signal-to-noise ratio of the signal at the receiving end before peak clipping. It can be seen that peak clipping improves the signal-to-noise ratio of the signal at the receiving end.

In the embodiment of the present invention, when selecting the MCS of the signal, not only the MCS may be selected according to channel quality fed back by the receiving end, but also a higher MCS may be selected by taking an increase in the signal-to-noise ratio introduced by peak clipping into consideration, so that the data transmission rate may be improved.

The method for transmitting a signal is applicable to all wireless communication systems in which a PAR is reduced, for example, a Long Term Evolution (LTE) system, a Worldwide Interoperability for Microwave Access (WiMAX) system, a Time Division-Synchronous Code Division Multiple Access (TD-SCDMA) system, a Wideband CDMA (WCDMA) system, a CDMA2000 system, and a Global System for Mobile Communications (GSM) system.

The embodiment of the present invention provides a method for transmitting a signal. In the technical solution provided in the embodiment of the present invention, the peak clipping threshold is selected according to whether the relative noise at the receiving end is known and the MCS of the signal, and then peak clipping is performed on the signal by using the selected peak clipping threshold. The embodiment of the present invention can select different peak clipping thresholds according to different MCSs of the signal, so that signal-to-noise ratios of received data with different MCSs are optimal. The signal-to-noise ratios of the received data are optimal, so that the reliability of data receiving is greatly improved. Moreover, because the signal-to-noise ratio increases after peak clipping, output power of the transmitted signal is reduced. The transmitting end may also select a higher MCS by taking an increase in the signal-to-noise ratio introduced by peak clipping into consideration when selecting the MCS of the signal, so as to improve the data transmission rate of the transmitting end.

An embodiment of the present invention further provides a device for transmitting a signal.

Figure 4:
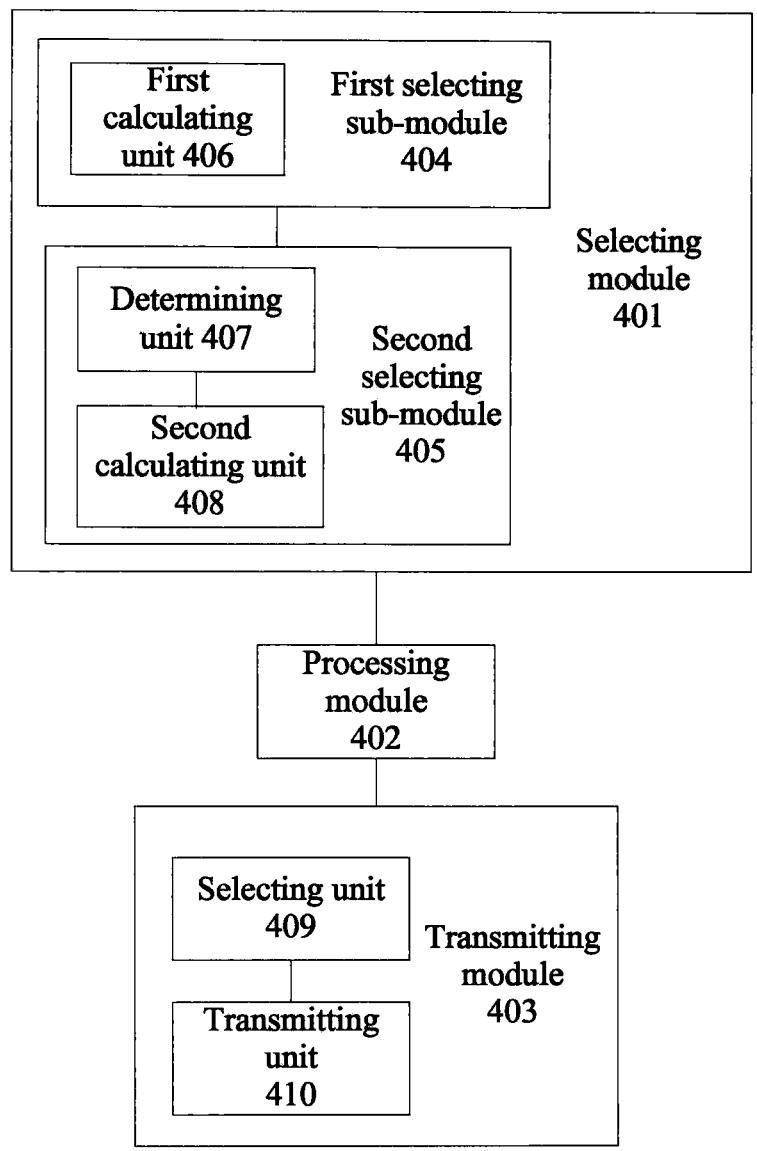
FIG. 4 is a block diagram of a device for transmitting a signal according to an embodiment of the present invention.

As shown in FIG. 4, the device includes a selecting module 401, a processing module 402 and a transmitting module 403.

The selecting module 401 is configured to select a peak clipping threshold according to an MCS of a signal. The processing module 402 is configured to perform peak clipping on the signal by using the selected peak clipping threshold. The transmitting module 403 is configured to transmit the peak-clipped signal.

For the selection of a peak clipping threshold two cases exist. In one case, a transmitting end knows relative noise at a receiving end; in the other case, the transmitting end does not know the relative noise at the receiving end. Optionally, the selecting module 401 includes a first selecting sub-module 404 and a second selecting sub-module 405.

When the transmitting end knows the relative noise at the receiving end, the first selecting sub-module 404 is configured to select the peak clipping threshold according to the MCS of the signal and the relative noise at the receiving end.

When the transmitting end does not know the relative noise at the receiving end, the second selecting sub-module 405 is configured to select the peak clipping threshold according to the MCS of the signal and a parameter k, where k is any value smaller than 1 and greater than 0.

The first selecting sub-module 404 includes:

a first calculating unit 406 is configured to calculate and obtain the peak clipping threshold through table lookup or direct calculation according to a formula $$\frac{n_r}{G^2} + \frac{n_1}{h^2 G^2} \le f(MCS)$$

when the relative noise at the receiving end is known to be $$\frac{n_1}{h^2},$$

where h is a wireless path loss intensity, $n_1$ is noise introduced by a signal at the receiving end, $n_r$ is power of noise introduced after peak clipping, MCS represents an MCS of the signal, f(MCS) is a corresponding relationship between the MCS of the signal and the noise at the receiving end, and G is the peak clipping threshold.

The second selecting sub-module 405 includes:

a determining unit 407, configured to determine the parameter k, where k is a value smaller than 1; and a second calculating unit 408, configured to calculate and obtain the peak clipping threshold according to a formula $$\frac{n_r}{G^2} = k * f(MCS),$$

where $n_r$ is power of noise introduced after peak clipping, MCS represents an MCS of the signal, f(MCS) is a corresponding relationship between the MCS of the signal and the noise at the receiving end, and G is the peak clipping threshold.

Further, the transmitting end may also select an MCS for the signal according to a signal-to-noise ratio of the peak-clipped signal, and transmit the signal according to the selected MCS. Therefore, the transmitting module 403 includes a selecting unit 409 and a transmitting unit 410.

The selecting unit 409 is configured to select an MCS for the signal according to the signal-to-noise ratio of the peak-clipped signal. The transmitting unit 410 is configured to transmit the signal according to the selected MCS.

The device for transmitting a signal is applicable to all wireless communication systems in which a PAR is reduced, for example, an LTE system, a WiMAX system, a TD-SCDMA system, a WCDMA system, a CDMA2000 system and a GSM system.

In the technical solution provided in the embodiment of the present invention, the transmitting end selects the peak clipping threshold according to whether the relative noise at the receiving end is known and the MCS of the signal, and then performs peak clipping on the signal by using the selected peak clipping threshold. The embodiment of the present invention can select different peak clipping thresholds according to different MCSs of the signal, so that signal-to-noise ratios of received data with different MCSs are optimal. The signal-to-noise ratios of the received data are optimal, so that the reliability of data receiving is greatly improved. Moreover, because the signal-to-noise ratio increases after peak clipping, output power of the transmitted signal is reduced. The transmitting end may also select a higher MCS by taking an increase in the signal-to-noise ratio introduced by peak clipping into consideration when selecting the MCS of the signal, so as to improve the data transmission rate of the transmitting end.

Persons of ordinary skill in the art should understand that, all of or part of the steps in the method according to the embodiments may be implemented by a program instructing relevant hardware. The programs may be stored in a computer readable storage medium. When the program is executed, the storage medium may be a read-only memory, a magnetic disk, or an optical disk.

The foregoing description is only the specific implementation of the present invention, but the protection scope of the present invention is not limited to the foregoing description. Any variation or replacement that may be easily thought of by persons skilled in the art within the technical scope disclosed by the present invention shall fall within the protection scope of the present invention. Therefore, the protection scope of the present invention shall be subject to the protection scope of the claims.

What is claimed is:

1. A method for transmitting a signal, comprising:

determining a peak clipping threshold of a signal according to f(MCS), wherein MCS represents a modulation and coding scheme (MCS) of the signal, and the f(MCS) is a corresponding relationship between the MCS and noise at a receiving end;

performing peak clipping on the signal by using the peak clipping threshold to obtain peak-clipped signal; and transmitting the peak-clipped signal wherein the determining the peak clipping threshold of the signal according to f(MCS) comprises at least one of the group consisting of:

(a) determining the peak clipping threshold according to f(MCS) and relative noise at the receiving end; and (b) determining the peak clipping threshold according to f(MCS) and a parameter k, wherein the parameter k is any value smaller than 1 and greater than 0, wherein the determining the peak clipping threshold according to f(MCS) and the relative noise at the receiving end comprises:

obtaining the peak clipping threshold through table lookup or calculation according to a formula $$\frac{n_r}{G^2} + \frac{n_1}{h^2 G^2} \leq f(MCS),$$

wherein $$\frac{n_1}{h^2}$$

is the relative noise at the receiving end, h is a wireless path loss intensity, $n_1$ is noise introduced by a signal at the receiving end, $n_r$ is power of noise introduced after peak clipping and $$n_r = \int_{r_b}^{1} G^2 (r - r_b)^2 p(r) dr,$$

G is the peak clipping threshold, and $r_b$ is a peak clipping point.

2. The method for transmitting a signal according to claim 1, wherein the determining the peak clipping threshold according to f(MCS) and the parameter k comprises:
determining the parameter k, and calculating and obtaining the peak clipping threshold according to a formula $$\frac{n_r}{G^2} = k * f(MCS),$$

wherein k is a value smaller than 1 and greater than 0, $n_r$ is power of noise introduced after peak clipping, and G is the peak clipping threshold.

3. The method for transmitting a signal according to claim 1, wherein after the transmitting the peak-clipped signal, the method further comprises:
determining an MCS according to a signal-to-noise ratio of the signal at the receiving end after peak clipping.

4. The method for transmitting a signal according to claim 3, wherein the determining the MCS according to the signal-to-noise ratio of the signal at the receiving end after peak clipping comprises:
determining the MCS according to channel quality fed back by the receiving end and the signal-to-noise ratio of the signal at the receiving end after peak clipping.

5. A device for transmitting a signal, comprising:
a selecting module, configured to select a peak clipping threshold according to a modulation and coding scheme (MCS) of a signal, wherein the selecting the peak clipping threshold according to the MCS of the signal comprises: determining the peak clipping threshold of the signal according to f(MCS), wherein MCS represents the MCS of the signal, and f(MCS) is a corresponding relationship between the MCS and noise at a receiving end;
a processing module configured to perform peak clipping on the signal by using the peak clipping threshold to obtain a peak-clipped signal; and a transmitting module, configured to transmit the peak-clipped signal,
wherein the selecting module comprises at least one of the group consisting of:
a first selectin sub-module, configured to select the peak clipping threshold according to the MCS of the signal and relative noise at the receiving end when the relative noise at the receiving end is known; and
a second selectin sub-module, configured to select the peak clipping threshold according to the MCS of the signal and a parameter k when the relative noise at the receiving end is unknown, wherein k is any value smaller than 1 and greater than 0,
wherein the first selecting sub-module comprises:
a first calculating unit, configured to obtain the peak clipping threshold through table lookup or direct calculation according to a formula $$\frac{n_r}{G^2} + \frac{n_1}{h^2 G^2} \leq f(MCS),$$

wherein h is a wireless path loss intensity, $n_1$ is noise introduced by a signal at the receiving end, $$\frac{n_1}{h^2}$$

is the relative noise at the receiving end, $n_r$ is power of noise introduced after peak clipping and $$n_r = \int_{r_b}^{1} G^2 (r - r_b)^2 p(r) dr,$$

and G is the peak clipping threshold.

6. The device for transmitting a signal according to claim 5, wherein the second selecting sub-module comprises:
a determining unit, configured to determine the parameter k, wherein k is a value smaller than 1 and greater than 0; and
a second calculating unit, configured to calculate and obtain the peak clipping threshold according to a formula $$\frac{n_r}{G^2} = k * f(MCS),$$

wherein $n_r$ is power of noise introduced after peak clipping, and G is the peak clipping threshold.

7. The device for transmitting a signal according to claim 5, wherein the transmitting module comprises:
a selecting unit, configured to select an MCS according to a signal-to-noise ratio of the signal at the receiving end after peak clipping; and
a transmitting unit, configured to transmit the signal according to the MCS selected by the selecting unit.

* * * * *

UNITED STATES PATENT AND TRADEMARK OFFICE
CERTIFICATE OF CORRECTION

PATENT NO. : 8,451,943 B2  
APPLICATION NO. : 13/334511  
DATED : May 28, 2013  
INVENTOR(S) : Jie Liu

Page 1 of 1

It is certified that error appears in the above-identified patent and that said Letters Patent is hereby corrected as shown below:

In the Claims:

Column 10, line 9, claim 5, "selectin" should read -- selecting --.

Column 10, line 5, claim 5, "selectin" should read -- selecting --.

Signed and Sealed this  
Thirteenth Day of August, 2013

Teresa Stanek Rea  
*Acting Director of the United States Patent and Trademark Office*